US011481751B1

(12) United States Patent
Chaubard

(10) Patent No.: US 11,481,751 B1
(45) Date of Patent: Oct. 25, 2022

(54) AUTOMATIC DEEP LEARNING COMPUTER VISION BASED RETAIL STORE CHECKOUT SYSTEM

(71) Applicant: Focal Systems, Inc., Burlingame, CA (US)

(72) Inventor: Francois Chaubard, Millbrae, CA (US)

(73) Assignee: Focal Systems, Inc., Burlingame, CA (US)

( * ) Notice: Subject to any disclaimer, the term of this patent is extended or adjusted under 35 U.S.C. 154(b) by 379 days.

(21) Appl. No.: 16/554,494

(22) Filed: Aug. 28, 2019

Related U.S. Application Data

(60) Provisional application No. 62/723,976, filed on Aug. 28, 2018.

(51) Int. Cl.
| | | |
|---|---|---|
| *G06Q 20/20* | (2012.01) | |
| *G06K 9/62* | (2022.01) | |
| *G06K 7/10* | (2006.01) | |
| *G06K 7/14* | (2006.01) | |
| *G06V 20/52* | (2022.01) | |
| *H04N 5/247* | (2006.01) | |
| *G06V 30/10* | (2022.01) | |

(52) U.S. Cl.
CPC ....... *G06Q 20/208* (2013.01); *G06K 7/10722* (2013.01); *G06K 7/1413* (2013.01); *G06K 9/6215* (2013.01); *G06V 20/52* (2022.01); *G06V 30/10* (2022.01); *H04N 5/247* (2013.01)

(58) Field of Classification Search
CPC .... G06Q 20/208; G06Q 20/20; G07G 1/0036; G07G 1/0054; G07G 1/0072
USPC ........ 705/23, 16, 64–79; 235/235, 487, 479, 235/385
See application file for complete search history.

(56) References Cited

U.S. PATENT DOCUMENTS

| | | | | |
|---|---|---|---|---|
| 10,664,722 | B1* | 5/2020 | Sharma | G06V 20/00 |
| 2004/0199427 | A1* | 10/2004 | van der Loo | G01G 19/4144 |
| | | | | 705/16 |
| 2008/0154736 | A1* | 6/2008 | Gatto | G01G 15/00 |
| | | | | 705/23 |
| 2010/0217678 | A1* | 8/2010 | Goncalves | G06Q 20/203 |
| | | | | 705/22 |
| 2014/0129362 | A1* | 5/2014 | Marquis | G07G 1/0036 |
| | | | | 705/23 |

(Continued)

*Primary Examiner* — Edwyn Labaze
(74) *Attorney, Agent, or Firm* — Thomas M. Freiburger

(57) ABSTRACT

A retail store automated checkout system uses images, video, or depth data to recognize products being purchased to expedite the checkout process and improve accuracy. All of a store's products, including those not sold in packages, such as fruits and vegetables, are imaged from a series of different angles and in different lighting conditions, to produce a library of images for each product. This library is used in a checkout system that takes images, video, and depth sensor readings as the products pass through the checkout area and remove bottlenecks later in the checkout process. Recognition of product identifiers or attributes such as barcode, QR code or other symbols, as well as OCR of product names, as well as the size and material of the product, can be additional or supplemental devices for identifying products being purchased. In another embodiment, an existing checkout or self-checkout scanner is enhanced with image recognition of products to achieve the same effect.

3 Claims, 8 Drawing Sheets

(56) References Cited

U.S. PATENT DOCUMENTS

| | | | | |
|---|---|---|---|---|
| 2014/0180479 A1* | 6/2014 | Argue | ............ | B25J 9/0093 |
| | | | | 700/259 |
| 2018/0157881 A1* | 6/2018 | Beghtol | ............ | G07G 1/0045 |
| 2019/0236363 A1* | 8/2019 | Bacelis | ............ | G06K 9/6263 |
| 2020/0143130 A1* | 5/2020 | Costello | ............ | H04N 13/271 |

* cited by examiner

AUTOMATIC DEEP LEARNING COMPUTER VISION BASED RETAIL STORE CHECKOUT SYSTEM

This application claims benefit of provisional application No. 62/723,976, filed Aug. 28, 2018.

BACKGROUND OF THE INVENTION

This invention concerns retail store checkout systems, particularly automation of store checkout systems.

Nearly all purchases at retail stores are through conventional checkout stands, each with a conveyor belt, a barcode scanner, a scale, a register and a cashier or through self-checkout units. Several types of self-checkout systems have been in common use in some grocery stores. With these systems, a customer carries selected items to the checkout stand and the cashier or customer scans each product individually with a barcode scanner, by carefully placing the barcode of the package adjacent to the scanner. Typically, a signal will be given to the customer or cashier, audible or visual, to confirm a successful scanning of each product. The customer, bagger, or cashier then places each item into a bag after scanning. When all items have been scanned and bagged, the customer is shown a list and a total amount and is prompted to pay.

A problem with these checkout and self-checkout systems is that non-barcoded products cannot be scanned, and require attention of the cashier which often results in extra work and added errors in the transaction. For example, fruits and vegetables such as oranges, lemons, cabbage, lettuce, etc. are placed in produce bags by the customer and do not carry any readable code. Many produce items are sold by weight. The customer places a produce item on a scale and is prompted to identify the type of produce, from a very long list, or the cashier has to remember or look up the Price Lookup Number or (PLU), but when in a rush or if inexperienced, the cashier often makes mistakes. This is especially true with organic versus non-organic items.

Another problem is that the packaged products take a long time to scan. The user, or a cashier if present, must scan them one at a time, and the time required for the user or cashier to find the barcode and align it is substantial. On average, a busy retail store with checkout clerks can process about 22 scans per minute, per single check stand. When customers scan at self-checkout, this metric is even worse, sometimes as low as 12 scans a minute.

Some additional types of self-checkout systems or partially automated checkout systems have previously been proposed. For example, see U.S. Pat. No. 4,039,355 showing a "tunnel" scanner that relies on barcode readers at several positions within a tunnel, in an attempt to read all coded items that pass through the tunnel, preferably on a conveyor, with the hope of increasing speed. Such scanners have not found commercial application, and in addition, they suffer the problems listed above regarding non-coded items.

There has been a need for a faster checkout system in retail stores, providing a high degree of reliability and speed, whether cashier-operated or self-checkout. Such a system also needs the capability of recognizing items that are not packaged and do not carry a machine-readable code, and not to rely on, or solely on, barcode reading as a primary means of product identification. And finally, this system needs to speed up all five (5) phases of the transaction which are placement, scanning, non-barcode scanning, bagging, and payment. The invention accomplishes these goals.

SUMMARY OF THE INVENTION

In the currently described invention, all or substantially all items in a store are recognized by photo images and depth sensors, as they pass through a checkout area. The area can be in the form of a tunnel space or designated area on a table, or a conveyor belt carrying the items through a tunnel or space. The space is defined by a frame or by an arm or arms supporting at least one camera or several cameras, for imaging all items in the space. This can be from a plurality of different angles and different positions as the item progresses on the conveyor. For a given item, if multiple camera images are obtained, they are matched by system software so that information from all images is combined for use in identifying the item. These images are compared in the software to a library of pre-stored labeled images, if available, and these may include multiple images for each of the store's products, taken from different angles. If an item in the checkout area is recognized to a sufficiently high probability, meeting a preset threshold of, e.g., 90%, that item is added to the checkout list and charged to the customer. If probability is too low, below the preset threshold, the system may prompt the customer or cashier to reposition the item if it appears stacking or occlusion has occurred, or to remove and scan that item using the store's existing scanning system. This ties the new image to the known store item, adding to the library of image data so that the item is more easily identified in future transactions at not just this register, but all registers that have this system. The customer or cashier can bag the items as the accelerated scanning is occurring. Finally, the customer checks out using cash, a credit card or a debit card as they do today or through a more modern method like face recognition, tap and go, or otherwise.

The system "learns" as more items are put through the checkout. The image library preferably is supplemented with new images as items are successfully identified. More importantly, when failing to identify a product by image as noted above, the system prompts the customer or cashier to use a scanner to scan the unidentified item's barcode or other product code to be read, thereby mapping that unrecognized segment of image or images or video or depth video to a label, the label being the barcode or some equivalent method of product classification, and adding that new labeled data to a large master image library held in the cloud or locally that can be used for continuous training of the algorithms that will now update and be pushed back to all the systems throughout the world. In a new installation of the system this can be the sole means of building the image library.

In one important aspect, the invention involves a synergistic retrofit of the computer vision system to existing retail checkout stations that utilize barcode or similar scanning technology. The retrofit can be inexpensive and can utilize the existing barcode scanning equipment for situations in which an item cannot be matched to a store inventory item to a sufficient probability. In this embodiment, the only retrofitting required is a single camera, looking downward on the current checkout area or conveyor belt, that plugs into a computer that performs the computer vision computation. The computer will plug into the current Point-of-Sale (POS) system and spoofs the communication protocol of a normal barcode scanner, in that when the cashier or customer picks up a recognized barcoded item, the system will make a "boop" noise and communicate this barcode to the POS in the same exact way a current barcode scanner does. This makes installation costs extremely inexpensive and integration costs almost zero. If the item is not barcoded but is recognized by the system (e.g. produce), the system will prompt the cashier to place the item on the scanner-scale by audio or otherwise, and the system will pair the weight with the item recognized to get the cost per pound, and then compute a total cost by multiplying the two together. If the non-barcoded item is a pay per unit item, the computer vision algorithms will count how many the system sees and multiply that by the cost per unit to get the total cost for that bag of items. If the item is not recognized, the cashier or customer will be prompted to scan the product. This will be signaled by the lack of a "boop" noise or by a specific error noise "err" noise after the customer has picked up the item.

In another embodiment, the same system is implemented as above, but the system includes also a monitor that displays what the computer vision algorithms are seeing, showing red boxes around products that are not recognized and green boxes for products that are. This gives the cashier or customer visual feedback as well as audio feedback which can make them more accurate and faster at checking out.

In another embodiment, the same system is implemented as the above paragraph, but when the computer vision algorithms are highly confident that one of the products (non-barcoded or barcoded) is one of a small subset of products (i.e. 2 or 3) then the monitor will allow the cashier to select which item it is from a downselected list. For example, if the customer is attempting to buy a macintosh apple, and the system assigns 49% probability that the item is a macintosh apple, a 30% probability that it is a gala apple, and a 20% probability that the item is a red delicious apple, then the system can prompt the cashier or customer to select on a screen from a downselected list (gala, macintosh, and red delicious). The cashier or customer can of course manually override the system by using the older system to select the appropriate item either out of convenience or if the actual product is not one of the items listed in the downselection. Once this selection is made, it will then be communicated to the POS and appended to the current transaction, but also, the selection will be used to label those segments of images, video, or depth data and added to the master image library for later training.

The invention also encompasses an embodiment wherein the customer places selected items, especially when no more than a dozen or so, onto a table, which may not be moving. In one implementation, this can be a glass table with one or more cameras below, and one or more cameras positioned above as well, at different angles. In another implementation the system can include one or more cameras above the table, without more. Preferably the customer or cashier is directed to spread the items out on the table, without stacking. The camera or cameras provide images to detect the presence of each item and the system works to identify each item. At the table are also a barcode scanner, scale, depth sensors and possibly other sensors. Items sold by weight are placed by the customer or cashier on the scale, and these items, such as produce, are recognized by the computer vision system. Alternatively the computer vision system can calculate the volume of an item or approximation of the volume of the item and multiply the volume times the product's known density to obtain weight. Once a produce item is recognized by the computer vision system a lookup table can be used by the software to obtain an average estimated density. Also, a scale in the bagging area can be used to compare measured total weight to the total of the known weights of the items recognized, as a check on accuracy.

In another implementation of the invention, an existing retail self-checkout station is retrofitted with equipment of the invention. In the upgraded form, the self-checkout station will recognize, by computer vision, produce and other non-coded items. One or more cameras are positioned at the station, at different viewing angles, for imaging each item brought forth by the customer. A scale is already included for produce sold by weight, and preferably an interactive touchscreen is provided for confirmation by the customer in the event, for example, the system does not recognize to a sufficiently high probability that selected produce is oranges or grapefruits, or between two different types of oranges or apples. Again, this further information can be added to the library once the customer has confirmed product identity.

The invention provides an efficient, effective, fast and low-cost solution to inadequacies and costs of retail store checkout systems, whether or not a cashier is involved. The speed of each checkout transaction can be approximately doubled. These and other objects, advantages and features of the invention will be apparent from the following description of preferred embodiments and implementations, considered with the company drawings.

DESCRIPTION OF PREFERRED EMBODIMENTS

Figure 1:
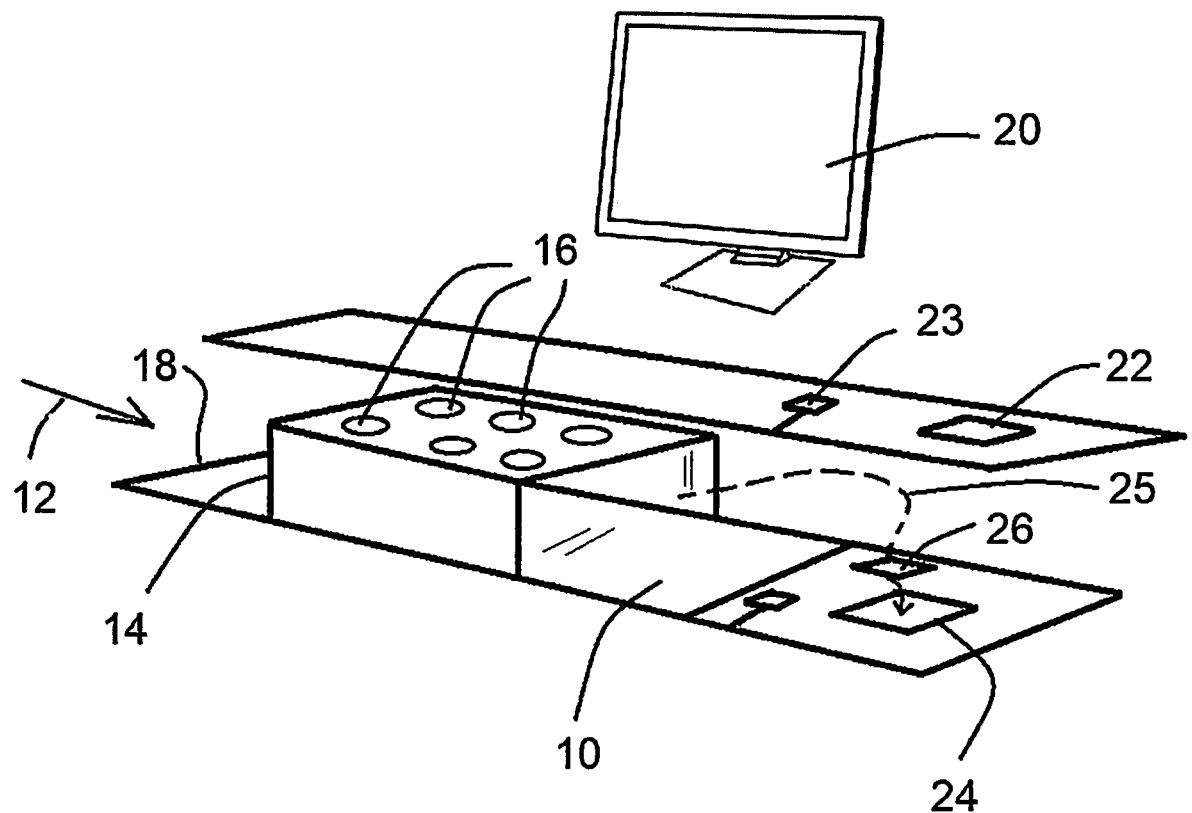
FIG. 1 is a simplified schematic perspective view to illustrate an embodiment of the invention, for a retail automated checkout station.

FIG. 1, in very schematic form, indicates an automated retail checkout system, showing apparatus added to a conventional checkout station according to the invention. An existing checkout conveyor 10, movable in the direction indicated by the arrow 12, is fitted with camera equipment which in this embodiment can be in the general configuration of a "tunnel" or a frame 14 that arches over or extends over the conveyor belt, generally as illustrated. The tunnel or frame carries a series of cameras 16, each of which images products as they pass through the tunnel, each from a different angle. The cameras can include side cameras, but primarily the cameras are at the top of the tunnel or frame, looking generally at the products as they move through.

A customer at the checkout places items on the conveyor belt at the entry end 18. Preferably the items are spread out so as not to have any stacked items and preferably with at least some space between items. This can be indicated in a written or screen instruction at the checkout; a screen is shown at 20. The customer can actually be caused to place items on the conveyor belt in single file, one behind the other, as by a narrowing entryway or guide rails (not shown) over the belt at the entry end 18, so that the items must flow in single file through the tunnel. This tends to ensure a specific product ordering that will make the downstream tasks of automatic identification easier and more accurate.

As is the case in many grocery stores, the belt system automatically senses that items have been placed by proximity sensors, computer vision, or otherwise, and the belt begins to run, moving the products through the tunnel or frame when the first item has been placed on the belt.

Once the customer's items have entered the tunnel, an array of top cameras 16, and optionally side cameras, as well as depth sensors and optionally other sensors will detect the presence of each item, and will work together with the programming of the system to attach a virtual bounding box around each product. The multiple bounding boxes and images of a particular item, from the several cameras, are matched by the software to obtain all information that can be extracted. If a specific unique identifier (SKU, PLU, UPC, QR code, etc.) is within an image and readable, this could be used for product identification, although this is usually not necessary. Also, optical character reading (OCR) could be employed, in the event the product name, size and other information is within the image and readable. In many cases neither the unique identifier nor full OCR information for identifying the product will be readable. The cameras and associated computer vision software in a system computer work to recognize each product by visual images, matched to a system database library of labeled images for each product in the store's inventory.

The system assigns a prediction probability for each item, and if it exceeds a preset confidence or probability threshold, the system will automatically add that product to a list of products being purchased by the customer, and a message is sent by the computer vision system of the invention to the existing point of sale unit in the store. Such communication may be by wire communication (TCB, HTTP, HTTPS, etc.), wireless (Bluetooth, 803.11, etc.) or simply by placing a barcode representing the particular product on a screen to be read by the existing infrastructure's barcode scanner. This is schematically indicated in FIG. 1, showing a small display screen 22 positioned above the existing barcode reader 24, just beyond the end of the conveyor run. The screen 22, if included, is located so as not to interfere with product movement, and can be on a shelf or bracket. The drawing also shows a keypad 23, which is for user input and payment functions and is located for convenient use.

If there are overlapping items or stacked items that occlude the camera or cameras, or if there are items in the tunnel that the cameras failed to capture or identify to the threshold probability, or if the tunnel otherwise made an error, then the non-identified items will be shown visually on the screen 20. As an example, a red bounding box can be shown around the unidentified item. The shopper or cashier or auditor in the store, can then manually correct the error by taking the item or items that were not identified and moving them (dashed line 25) by the pre-existing barcode scanner 24 or another scanner, as indicated at 26, therefore correcting the list of items and the amount owed. Alternatively, the system can prompt the customer or cashier to select from a list of screen-shown choices to confirm the correct product from a list of system-generated guesses.

Alternatively, or in addition to the above, for stacked/occluded items a robot arm (not shown) can be provided within the tunnel or frame, to swing out and move the advancing items, shifting their positions somewhat, and, in most cases, shifting the occluded items sufficiently to be correctly identified.

Each time the image based checkout is used, the system saves the images and other sensor data collected, along with any manual overrides or manual barcode scans done by the customer or store employee, and pairs these data as a labeled data set or image and bounding box and UPC, SKU or other identifier, that is added to the data library of the system to make it even more accurate. Thus, the system constantly improves in accuracy on virtually every transaction. In fact the system as initially placed in a store can "learn" an entire library of image data by repeated use of the system. This can be true also if installed in a completely "passive mode" where the system declares every item a "red box" or unrecognized item. Each time an item is presented that has no image match in the library, the system prompts the user, or the user is simply expected as the convention is set today, regarding the item in question, to do a barcode (other unique identifier) scan, identifying an item in inventory, and the library will then contain images tied to the item. Once the system has accomplished a specific precision of prediction and recall of prediction (or accuracy or any other threshold), then the system can switch from passive to active and actually start making recommendations. This measurement of accuracy could be accomplished by pairing input data (like images, video, and depth data) and transaction log data (UPCs (Universal Product Codes), barcodes, quantities, and time in which that product was scanned by the cashier or customer) to produce a labeled test set that the computer vision algorithms can attempt to score well on. Additionally, this idea can be a way for the computer vision system to perform Quality Assurance ongoing where for certain registers or in certain transactions (randomly selected or otherwise selected) the system will prompt the cashier or customer to scan the items the traditional way and the system will make a prediction after the fact and then attempt to match the predicted transaction (UPCs and quantities) and the actual transaction (UPCs and quantities), where the accuracy of the match could be measured as overlap of the two or otherwise. This gives an automatic way of inferring the reliability and accuracy of the system.

Figure 1A:
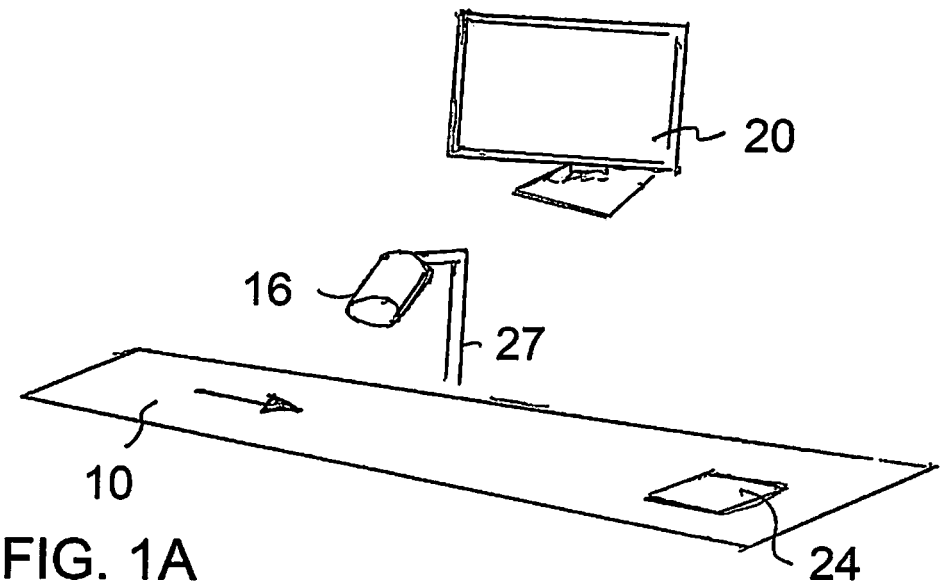
FIG. 1A is a view similar to FIG. 1 but showing a modified form of the invention.

FIG. 1A shows a preferred embodiment which is a variation of FIG. 1. In this embodiment, only a single imaging camera 16 is included, held on an arm 27 adjacent to the conveyor belt 10. It has been found that a single imaging camera can, to a very high probability, provide an adequate image or images of a customer item so as to be recognized in the software. Again, the barcode scanner 24 (which can be preexisting in the store) is used each time the system is unable to recognize an item, thus adding useful data in the image library.

Figure 1B:
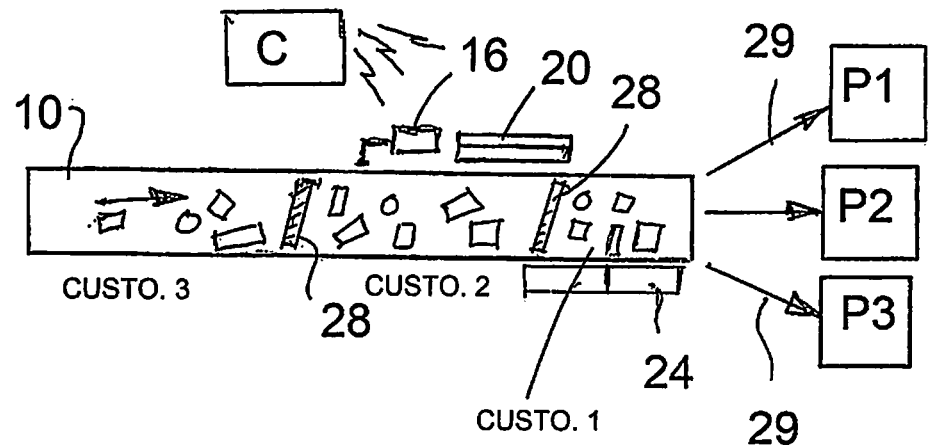
FIG. 1B is a plan schematic view showing a further feature of the system.

The schematic view in FIG. 1B shows a system as in FIG. 1 or 1A capable of processing several customers' transactions on the same conveyor belt, for a faster throughput. In a typical checkout situation today, the three major bottlenecks are scanning, bagging and paying. The computer vision system of the invention can increase speed of scanning, from about 22 scans per minute (with barcode scanning) to about 45 scans per minute, but the bagging and paying hinder throughput speed to render this improvement less meaningful. In FIG. 1B multiple bagging and paying stations (P stations titled P1, P2, . . . Pn) are positioned at the end of the conveyor belt 10, so that customers' goods are shuttled successively to different ones of the pay stations. This alleviates the sequential dependence on any one transaction to hang up or delay succeeding transactions, removing the ordinary bottleneck of payment and bagging and distributing these functions to multiple stations. The drawing shows that Customer 1 is followed by Customer 2 and then Customer 3, the customers placing their items on the belt in series. Customer dividers 28 are placed between the items on one customer and the next, in the usual way, and the camera 16 images the divider so that the system recognizes that behind each divider is a separate transaction. Thus each transaction is processed separately. On the screen Customer 1 is directed to then go to an available pay station (one of P1 to Pn, not necessarily P1), and the items of that transaction are shuttled to that pay station after they have been scanned by the cashier or the computer vision system.

The shuttling apparatus can take any of several different forms. It can include a mechanical diverter arm that directs items left or right, or straight ahead; additional short local conveyors can help bring the goods to the pay stations. The shuttling could be simply by a human pushing items. The apparatus could include a short conveyor belt in tandem with the belt 10, to be started and stopped as needed, under the control of the computer and/or cashier, to obtain proper timing of the movement of the items of a transaction. This short conveyor could work in conjunction with additional short conveyors leading to the respective pay stations, or a gravity system might be employed, allowing the items to slide down a slope or roller conveyor to the correct pay station. In FIG. 1B the pay station shuttling means are shown schematically by arrows 29; it is well within the skill of a mechanic to select an appropriate transfer arrangement for shuttling customers' identified items to the pay station designated by the system, which includes the computer processor, programming and database indicated at C in the drawing.

Once the items are properly shuttled to the correct pay station (Customer 1's items to an available pay station, etc.), then the customer is prompted to bag and pay at their leisure. The customer could also prompt (or automatically receive) bagging assistance.

In a preferred embodiment the system, once it has confirmed all of a customer's items and provided the tally, will check if pay station 1 is occupied or available. If available the customer's items are directed there. If not, pay station 2 will be checked, and so on until a pay station is assigned, and the system then controls the shuttle to direct the items to the assigned pay station.

Figure 4:
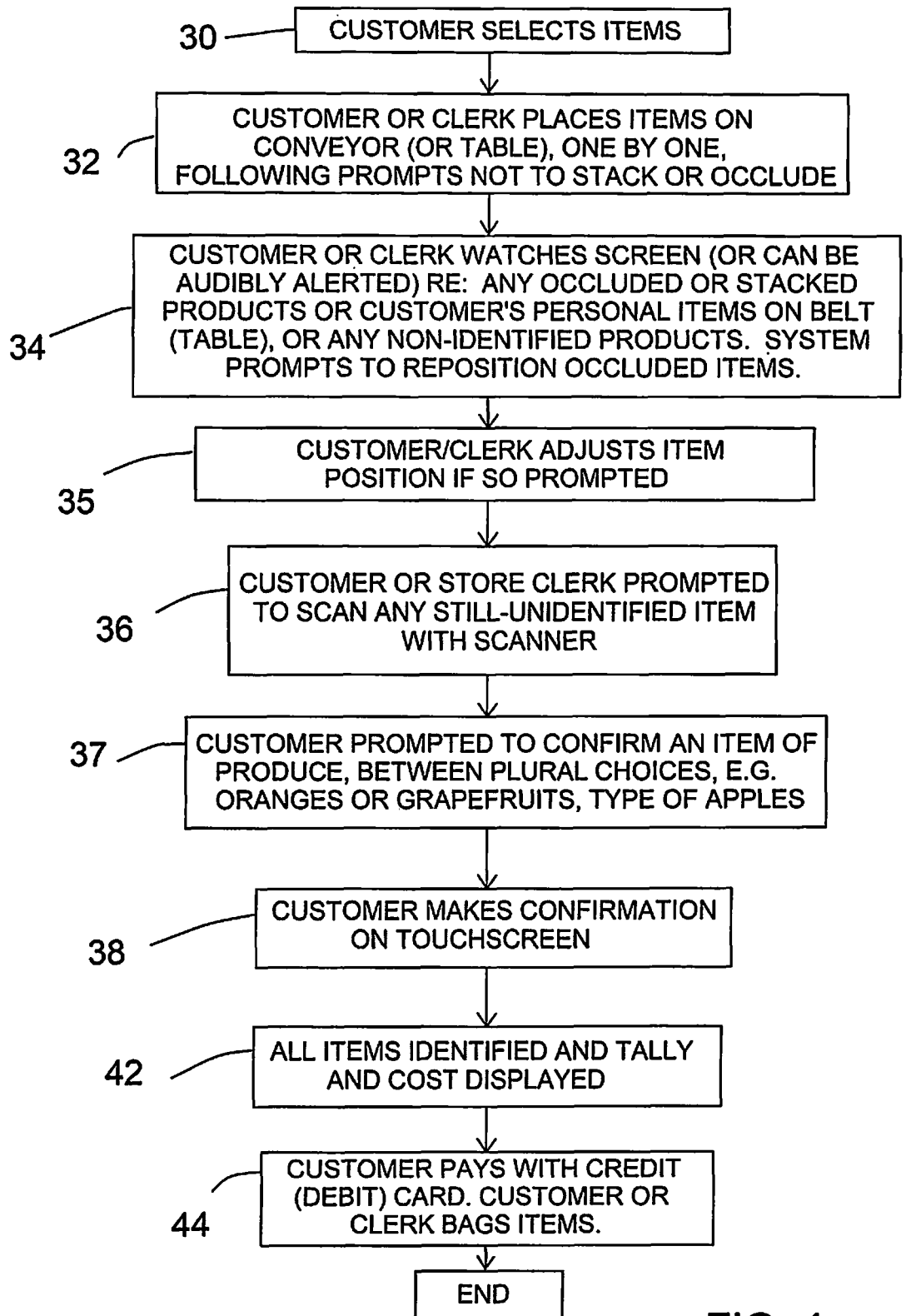
FIG. 4 is a simplified flow chart indicating customer experience in using one of the automated checkout systems of the invention.

FIG. 4 is a basic flow chart illustrating user experience in the checkout system of the invention. At the block 30 the customer selects desired items from the store shelves. The customer then places the items on the conveyor belt, or on a table, one by one or all at once. The customer follows instructions, which can be on the display screen 20, not to stack items or place them closely in contact with one another, as indicated in the block 32. As noted in the block 34, the customer watches the screen 20, or audible alerts could be provided, in the case of any occluded or stacked products, any customer personal items on the belt or table, or any items the system is not able to identify. If occlusion is indicated (by image) the position of the item is adjusted, block 35. If there are still unidentified items, the customer/cashier is prompted to scan any such item with the scanner, as in the block 36. In the case where the system recognizes several possibilities for an item, each with a below-threshold possibility, the system can put on the screen several "guesses". The customer is prompted to confirm the identity of a product, from two or more choices (block 36), and the customer makes a confirmation (block 37) on the touch-screen 20 (or using the keypad) to identify the correct product. Alongside the choices on the screen will be an image of the product in doubt.

As explained above, if any item cannot be identified, the customer or cashier will be prompted to scan the identified item with the existing checkout stand scanner (24 in FIG. 1).

At the block 42, all customer items have been identified, and the system displays a tally of all items, the cost of each and the total. In the block 44, the customer pays typically with a credit card (the term is intended to include a debit card or use of an electronic device such as a smartphone). The system preferably also provides for payment in cash, preferably with a cash-accepting machine. The system can also allow to checkout with any other method. The customer bags the items and the transaction is complete.

Figure 5:
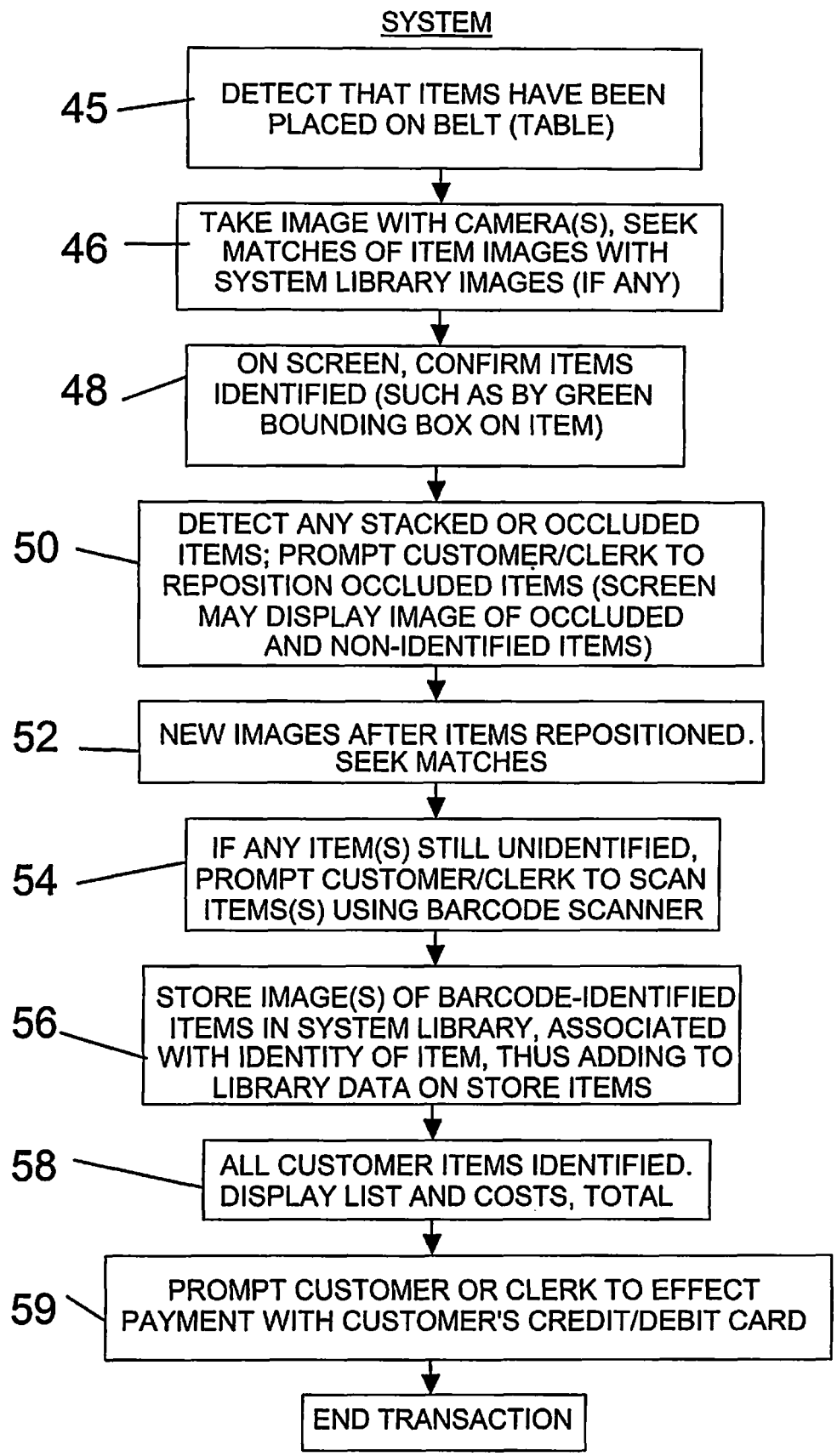
FIG. 5 is a simplified flow chart showing system steps in a transaction.

FIG. 5 shows, in a simplified block diagram, the steps of a transaction from the point of view of the system. In the block 45, the system detects the placement of items on the conveyor belt or table. At block 46, the camera or cameras take images or video of each item and seek to match the images with system library images using computer vision, specifically deep neural networks. If the library includes any images of that product, or it is otherwise classified correctly, the system displays on the screen that items, with images, have been identified and sends that information to the POS to append that item to the current transaction. As one example, a green bounding box (box can be any shape) can be shown around each item as it is identified, as noted in the block 48. The system detects any stacked or occluded items or other miscellaneous things that might be on the conveyor belt, prompting the customer/cashier to reposition such items, as in the block 50. Following this, new images are taken by the system after items have been repositioned or moved (block 52). As noted in the block 54, if any items are still unidentified, including after any choices have been presented to the customer/cashier as in FIG. 4, the customer or cashier is prompted to scan those items using the barcode scanner.

As noted above and indicated in the block 56, the system learns from each barcode identification, and new images of items identified by barcode in the transaction are added to the master image library of the system. These are associated with identity of the store item in inventory, such as SKU. At the block 58, the system has identified all customer items and displays the list of items, costs, and the total. The customer or cashier is then prompted to make payment with the customer's credit card. Again, a machine for accepting cash can be included as an alternative to credit card or any other payment method.

Below is a more detailed description of the manner in which the computer vision system recognizes products.

The system performs product detection and recognition that outputs a virtual bounding box around every product in the image and then recognizes the contents of each bounding box by its visual cues, by its "likeness" or "visual affinity" to a template, a classifier, or known/labeled image, or by recognizing the barcode, or by matching to a specific known shape or material, or by reading the information on the packaging of the product via OCR, or some combination of all the aforementioned.

The preferred embodiment works in the following way. First a Convolutional Neural Network (CNN) is run to infer if there exists a product at each part of the image, and if so impose a bounding shape to fit around each distinct product (perhaps a box or polygon, and if using depth, a bounding cuboid or prism or frustrum. Each bounding shape is processed individually, running optical character recognition (OCR) on it to attempt to read any words on the packaging of the product and using a barcode detection algorithm to try to find and recognize barcodes if in the image, if such exist or are able to be read. In addition, a template matching algorithm is applied, taking a database of labeled "known" products or by using a classifier that was already trained to detect those "known" products and attempting to match each one to the pixels in the bounding shape. This template matching process takes in a known image and the bounding box image and outputs a probability of match. This could be done with a Siamese CNN or by a more well studied, more classical, descriptor and homography based approach. Another approach is to train a CNN to output the probability per product over all the possible products. However, maintaining and training such a large CNN is difficult, especially since we would need to retrain this every time one of the products changes or we want to add one new product. This much retraining may not be scalable. Thus, the system can employ an "embedding" Convolutional Neural Network that is a function that maps from a set of pixels, video, or depth pixels to a compact description or embedding vector that can be used to quickly compare the new unknown embedding vector to millions of other "known" embedding vectors that came from images with labels from the master image library with a distance function like cosine distance or Lp-Norm or otherwise. Such a comparison from between the unknown embedding vector to millions of known embedding vectors can be done in milliseconds on a Graphical Processing Unit (GPU) or other parallelized processing system.

The output of this portion of the processing per product bounding box is then a series of bounding shapes, each with an associated set of "features", which could be written words and their locations in the images, such as "Tide" or "Coca-Cola", a bounding box around the barcode inside the product bounding shape if it is there, and the results of the template matching process which is a list of probabilities or distances of a match with each of the known classes. Then all of this information about this product within the bounding box is taken together and the system tries to infer the correct SKU (Stock Keeping Unit), UPC, or other product identifier of the product. To do this, the system preferably performs a "waterfall" classification scheme that works in the following way. First, if the barcode is read, then it is taken as truth and the process is finished. In some embodiments, the system will still continue the processing even after detecting a barcode to detect a form of theft called "tag switching", a trick that people looking to steal from the store use, which consists of adding a tag of an inexpensive item (like ground beef) on an expensive item (like filet mignon) to get a lower price. If the barcode is not detected, the system tries to match the text read from the OCR to a database of known information about all the "known" products and to match the text to a dictionary or lexicon via Jaccard Similarity or otherwise. If there is a match above a certain threshold, then the process is finished and we have our match. In some embodiments, we will continue our processing to increase system accuracy. If there is no text or the Jaccard Similarity is not high enough, then the template matching pipeline or embedding vector method is run to produce a set of classifications, scores, or distances of all "known" products and the system will merge that information with other known information such as previous "track information" (which we will define further below) or the OCR Jaccard Similarity information or barcode information or any other information to produce a best estimated probability across all "known" products and take the argmax of those probabilities over all known products/SKUs to make a final guess as to what the product in the bounding shape is. Finally, the cleaned output of this pipeline is a list of bounding shapes for each product in the image, a guess of a product identifier per bounding shape, and an associated probability per guess per bounding shape. If this occurs at time (t), we will call this output Ft.

In some embodiments, the algorithm at time (t) will take into account previous information already known or calculated before time (t) to help in calculating Ft. For example, if the system produced new measurements or takes new images every 50 milliseconds, it does not make sense that the products will have shifted that much in such a short amount of time. Therefore, it is often the case that the products can be tracked from frame to frame to help smooth predictions and carry over information as the system calculates more Fts. In one instantiation of this, the system can attempt to merge each bounding shape in the last timesteps' Ft, or Ft-1, to the current set of bounding shapes just detected. The matching algorithm between two sets of bounding shapes could be performed by taking one bounding shape from each set and computing the overlap (or intersection of union) in 2D or 3D of the two bounding shapes and/or using visual similarity information like Mutual Information or SSIM (Structural Similarity) Index of the two bounding shapes, and doing this for all pairs, and then using the Hungarian Algorithm to make the final assignment. If there is no good match for a bounding shape in Ft-1, then it is likely this product is now removed or occluded. If this bounding shape is not matched to in a certain number of frames, the system will alert that the item has been removed. In some instantiations, this will be implied to mean that the item was removed and bagged. In this case, the system will communicate to the POS that that UPC should be "added" and will tell the user that we have recognized the item by an audible sound like a "boop" or by visual feedback. In some embodiments, the user can manually override this information by barcode scanning the item or manually deleting the item from the transaction or otherwise.

Figure 7:
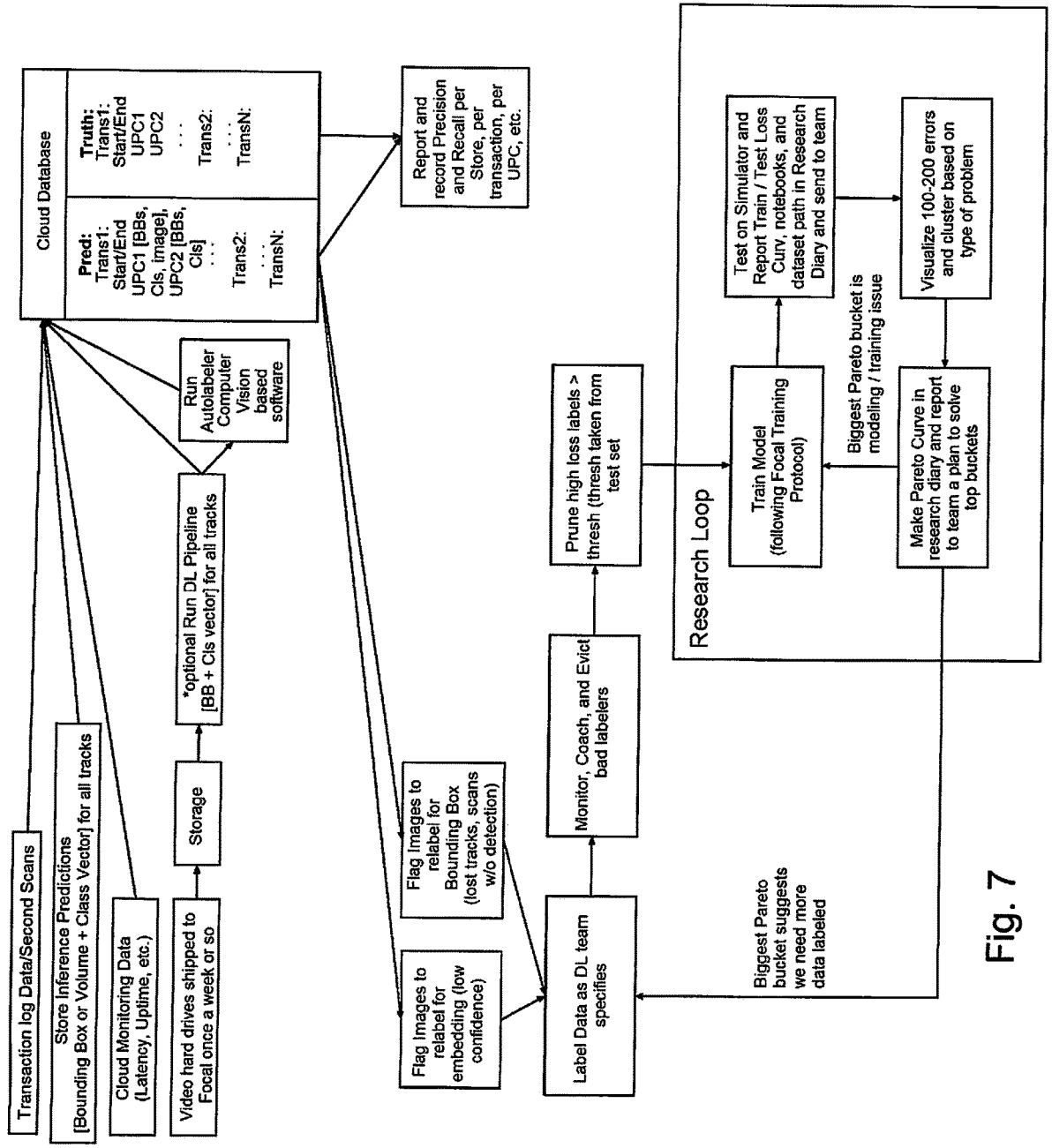
FIG. 7 is a flowchart of how new input data can be paired with transaction log data to produce labeled training data to retrain the computer vision algorithms.

In FIG. 7, we demonstrate the curation of the master image library and the training, retraining, and evaluation of the system. The system is fed daily, weekly, or otherwise, with Transaction log data with timestamps, the Fts from the system with timestamps, all general computer information such as the time of inference, calculation, and other diagnostic information, the raw image, video, and/or depth data. All of this data is fed into an Autolabeler system that pairs all of the information based on the time of the events. This allows the system to compare the predicted transaction with the Transaction Log data to assign each transaction a score of accuracy (measured as precision and recall between the actual transaction, if that data exists, and the predicted transaction). All of this data is stored into a database on the cloud. In the event there is a low confidence or wrong prediction, this flags to the system that that class should be retrained and could mean that the original images that the system was trained on are not accurate so they should be flagged for a labeler to verify that the image is correct. In some embodiments, there is no labeling team and the new data is automatically retrained on. There may be cleaning steps to remove likely inaccurate data. Such an example of automatic cleaning is by calculating the loss of the objective function (typically cross-entropy loss) produced by the prediction and the truth label on a specific image, and if the loss is above a certain number (i.e. 10 for cross-entropy), then that is too high for the model to be that wrong, so we can remove this image from our master image library. In other embodiments, the labeling team is instructed to label and relabel certain data before retraining occurs. With an updated set of labeled images, we retrain the models in the pipeline and test it on a curated set of test transactions in a simulator to ensure the newly trained models outperform the previous models. In some embodiments, the labeling team would visualize a few error cases and cluster the type of errors into specific buckets called Pareto buckets (i.e. "overexposed image", "dark products", "occluded item", "apples"). Then the labeling team will relabel or gather more data to solve the highest offending bucket of errors to get more accurate data to retrain the models or change the way the data is collected with new angles or new hardware or change the training or model or inference methods or thresholds.

Installation of the system of the invention, as a retrofit to an existing barcode scanning checkout system, is economical and easily accomplished. In one preferred embodiment the system includes a single three-sided platform, e.g. the tunnel 14 shown in FIG. 1, that screws securely into place just to each side of the conveyor belt, or the single camera 16 of FIG. 1A is installed. A wire connects the tunnel or camera for power, and another wire connects the tunnel or camera to the existing POS system, although this could also be done wirelessly, or by a screen (see 22 in FIG. 1) mounted near the existing barcode reader that displays the barcodes of what is seen by the computer vision, along the existing barcode reader 24 to detect the barcode and register the product. The computer vision system is connected to a central store server or by Internet to a cloud server for the processing needed in product recognition via computer vision.

As noted above, during initial months of an installed system, the system will not have sufficient labeled training data (or initially any image data) to be able to very accurately identify products via computer vision. However, the system can initially be put into a passive data collection mode, or silent mode, collecting all image data required as thousands of products are passed through the system, while a store cashier or customer still scans the products in the conventional manner. This provides a "bootstrap" training mode. The system will associate the images to bounding shapes and/or to unique identifiers per product bounding shape by the action of the customer's or clerk's manually scanning each product in the conventional way. Since the cashier attains the unique identifier of each product in the same exact order as the cameras are detecting the products via a general purpose (or unique identifier agnostic) product bounding shape model or a depth sensor or tracking system or otherwise, the normal behavior of the cashier can be used to collect and label the data set for the system, at very low cost and with high effectiveness. The camera could also be positioned during this passive mode to image each item as it is scanned, to tie the image to the barcode. Alternatively, during the initial period the items can be scanned when a screen prompt occurs showing an image, thus automatically tying the image to the item.

Figure 2:
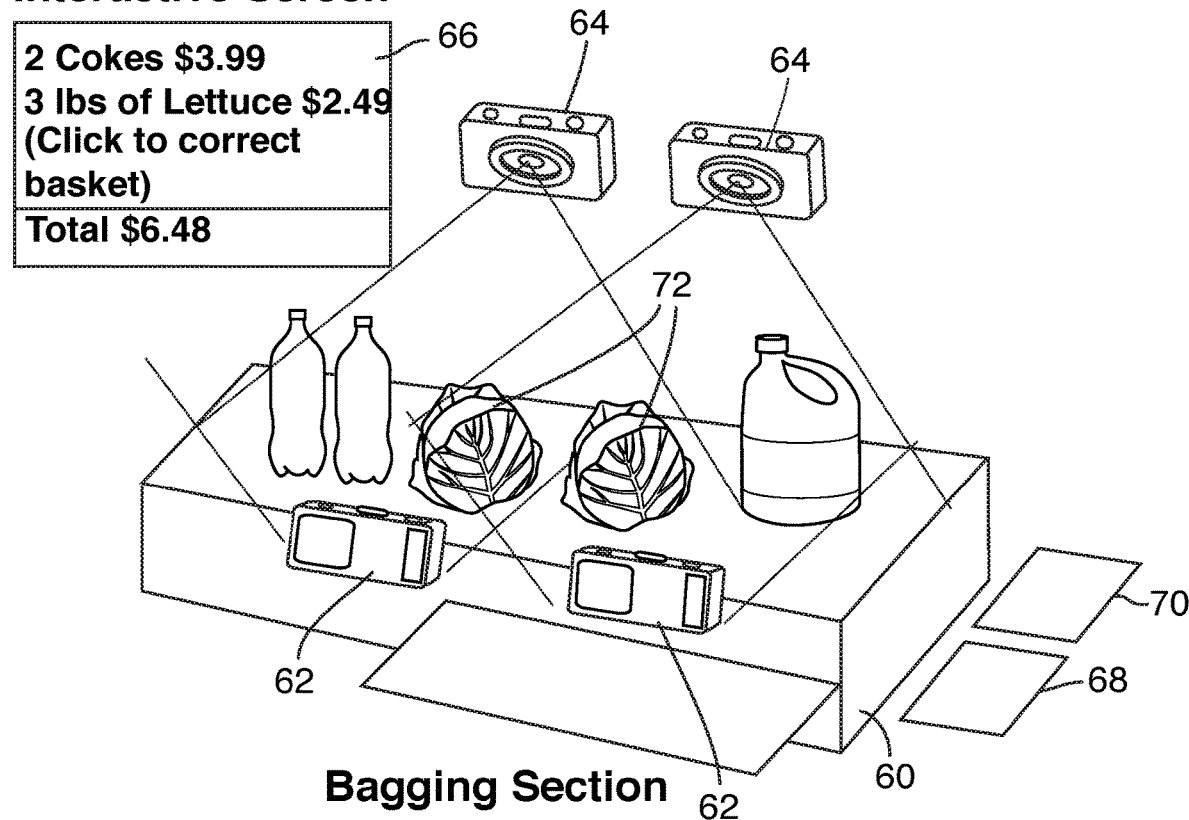
FIG. 2 is a schematic perspective showing another implementation of the invention.

FIG. 2 shows a second instantiation of the invention, in which the items selected by the shopper are placed on a table schematically indicated at 60. This table typically is non-moving, although it could comprise a conveyor belt.

The table 60 may be glass or other transparent material, with cameras 62 below the table as well as cameras 64 above the table. This autocheckout station or kiosk is useful primarily for checking out a limited number of items, such as a maximum ten, or maximum twenty, depending on the size of the table. The customer spreads out all items onto the table 60. The system is activated by the presence of the items, and the array of top cameras 64 and bottom cameras 62, along with barcode scanners, depth sensors, a scale and optionally other sensors detect the presence of each item and work together, through the software, to identify the UPC of each item. Note that the system could include only the above-table cameras.

If there are items the system cannot identify, the system will prompt the user via an interactive screen 66 to help the system assign UPCs to the unidentified items. This can be in the same manner as described above, with several choices inferred by the system and placed as choices on the screen. Otherwise, the system can prompt the user to run the unidentified items by a barcode reader 68 adjacent to the table. The unidentified items can be pictured on the screen 66 for the customer's reference.

In one embodiment of the invention, the interactive screen 66 can prompt the customer to move the items around if some items are occluded, such as by stacking or placement too closely together, so the items can be accurately identify by the computer vision system.

A scale 70 is included, for items sold by weight such as produce (cabbages 72 shown in the schematic diagram). The system prompts the user via the screen 66 to place the produce (e.g. cabbage) on the scale so that it can be charged by weight. Note that the barcode reader 68 and the scale 70 can be combined.

As with the system of FIG. 1 fewer cameras can be included, still obtaining a high reliability of computer-vision based product identification.

Figure 3:
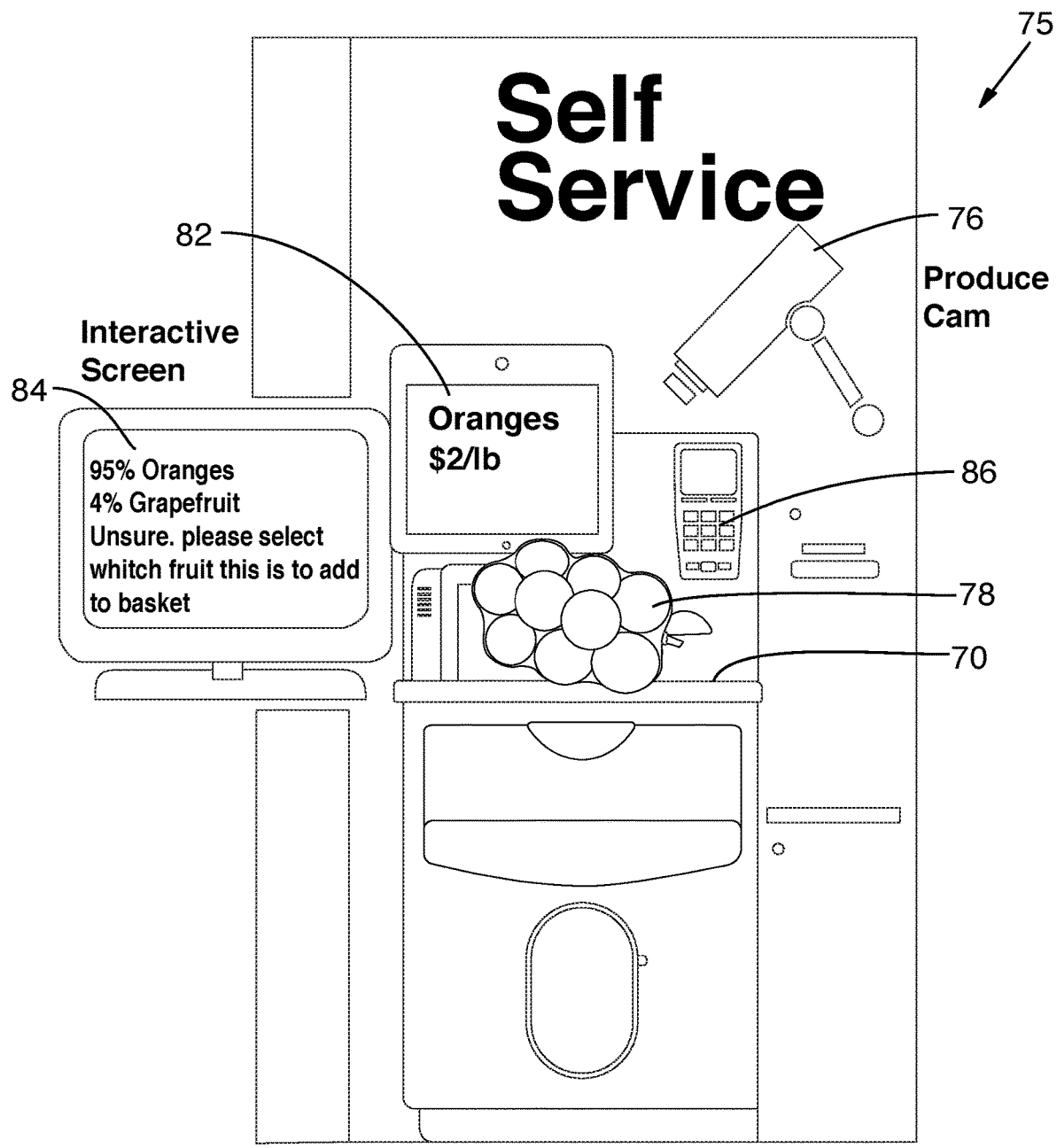
FIG. 3 illustrates a retrofit of an existing self-checkout, barcode-reading station with improvements according to the invention.

FIG. 3 schematically indicates a retrofitting of an existing self-service checkout station in accordance with the invention. This is primarily to improve and complete the function of a self-service checkout stand by enabling the system to recognize produce and any other items that may not be capable of barcoding. The self-service stand 75 is updated with one or more cameras 76 for the purpose of identifying such non-machine readable items. A bag of oranges 78 is shown on the self-service kiosk's scale 80, which can be the platform on which barcode items are normally set for reading. The camera or cameras 76 take one or more images of the produce 78, and the process of identification as described above (and below) is initiated by the system of the invention. The kiosk's existing display screen 82 is used to display the identified item, preferably with price per pound and calculated cost of the produce item. Another screen 84 is indicated in this schematic view, illustrating a situation in which the system has a high level of confidence that the produce should be identified as oranges, but with a 4% possibility the produce could be grapefruit. The user/customer is prompted to select the correct item, which could be by touchscreen or by selection using the screen along with an input device such as shown at 86, which may be a component of the conventional system. The screen 84 can also provide prompts to the user, similar to those described above, when appropriate. Note that the screen 84, although shown separately, could be the same screen 82 as was included with the original equipment at the kiosk.

In operation of the system, the array of top and/or side cameras 76, barcode scanners, depth sensors, the scale and optionally other sensors detect presence and location of each product, and work together, with the system software, to identify when the user places something on the shelf 80; to identify the item as fruit, vegetable or otherwise; then if fruit or vegetable, to recognize the specific fruit or vegetable. If the prediction probability is above a set threshold, then the system will automatically send a message over a communication protocol to the self-checkout kiosk system to automatically insert that particular price lookup (PLU), to add the weight as measured by the scale, times the price of that PLU. This will give the total owed by the customer for that produce without the user's having to select that PLU from a long list of produce items.

If the prediction probability is low, the system will prompt the user via the screen to select the fruit from the top guesses (e.g. the top five) as to what is the identity of the fruit or vegetable. Then the system will automatically send a message over a communication protocol to the existing system of the self checkout unit to insert that PLU. As explained above, the system takes the weight as measured by the scale multiplied by the price of that PLU to arrive at the total weight of the product.

Figure 6:
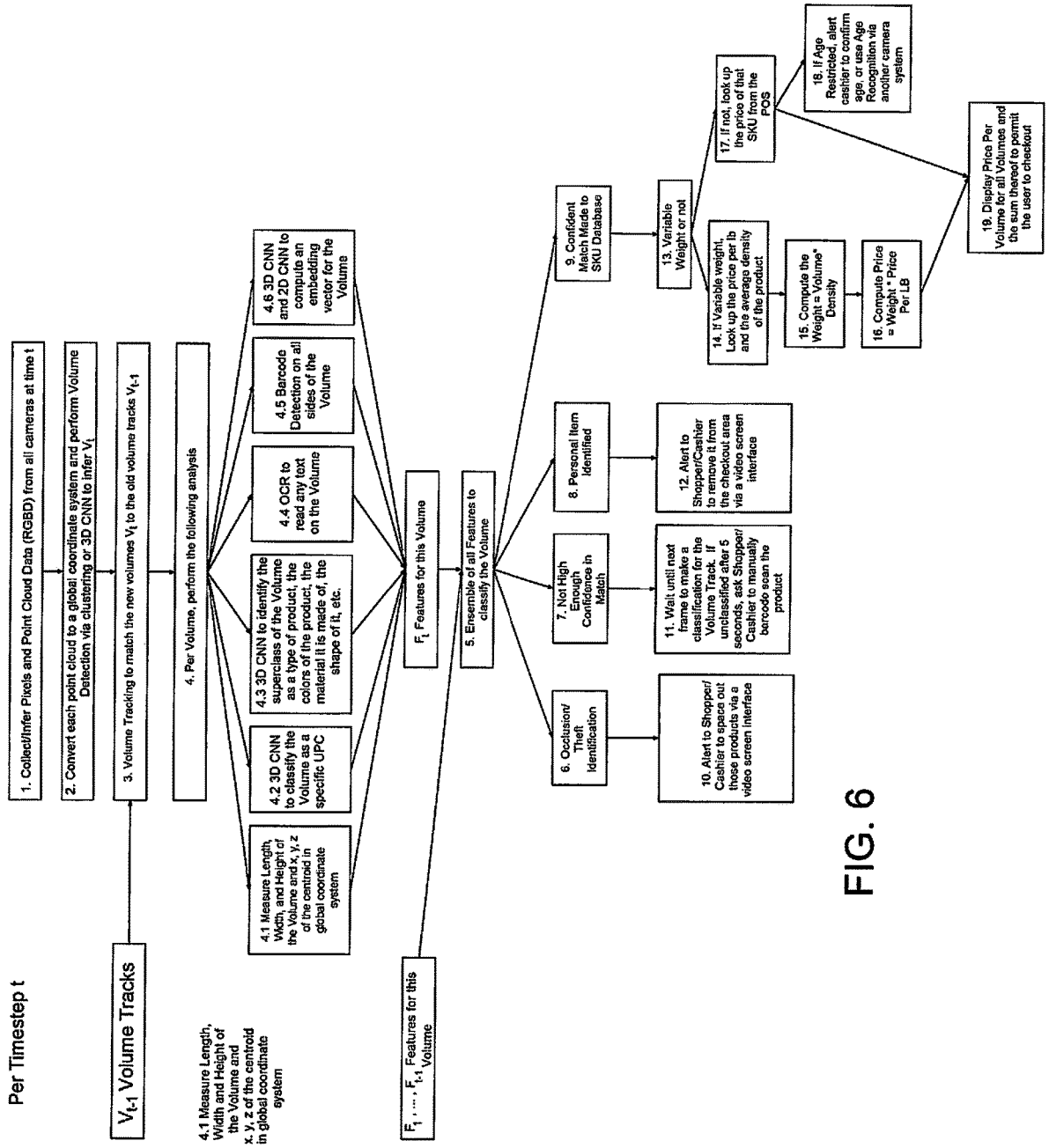
FIG. 6 is another simplified flow chart, to illustrate logic of the system in identifying products placed at the automated checkout station by the customer.

FIG. 6 shows, still in simplified form but in greater detail, a preferred product identification algorithm and scheme of the invention.

Algorithm Pipeline:

For Every Timestep t:

1. Collect/Infer Pixels and Point Cloud Data (RGBD) from all Cameras at Time t

For each time step t, the host CPU or GPU or otherwise will load the most recent readings captured from all attached and powered cameras and sensors into the processors memory. Depending on the camera or sensor type, we may preprocess the data in different ways to best prepare the data for later stages of the processing pipeline.

If the sensors is a Depth Camera that provides RGBD camera output (i.e. at 30 frames per second), then the depth component for this sensor is given with no further computation required.

If the sensors is a depth only sensor that provides a 3D point cloud without RGB information like a LIDAR or RADAR, then the depth information could be merged with an additional RGB camera to output RGBD together. This may be a good approach since sensors that only output depth are more accurate in the depth dimension than cameras that do both RGB and Depth. In some instantiations, the color may be inferred algorithmically with automatic image colorization techniques either by a CNN or otherwise.

If the sensor is a single monocular camera that is not coupled with a depth sensor, then the depth could be inferred from the RGB information. There are many approaches to solve Monocular Depth Estimation, to estimate depth per pixel from an RGB input. In one embodiment, we would use a CNN that has been trained to take image input and mimic the output of an active sensor that accurately estimates depth such as a RADAR and LIDAR system. In another, we would use a CNN that was trained without such information, but trained to utilize left and right stereo camera pairs. The training ensures that the left image depth output projected onto the right image depth output are consistent, meaning that the depths are similar to each other. This left-right consistency in the mapping can provide sufficient training data without depth information.

If the sensor is a stereo camera system that has 2 or more cameras, we can infer the depth information from a series of different approaches that solve the Stereo Matching problem which outputs RGBD. In one embodiment, we would infer the depth map via a CNN that was trained to mimic the output of an active sensor that accurately estimates depth such as a RADAR and LIDAR system utilizing both the left and right and perhaps even more cameras' image data. In another, we would estimate the Fundamental Matrix to solve for the 3D point cloud if we know the camera intrinsic matrix for each camera and the distance between the cameras.

2. Convert Each Point Cloud to a Global Coordinate System, Combine all the Point Cloud Information from all Cameras into One Point Cloud, and Perform Object Detection Via Clustering or 3D CNN to Infer Vt Every camera in the system has its own coordinate system. To fuse this information for each camera in a coherent way, the system will have a fixed and known position and orientation (position=x,y,z, orientation=$\alpha$, $\beta$, $\gamma$ and scaling=$s_x$, $s_y$, $s_z$) from the global origin to each cameras coordinate system. These 9 numbers will be theoretically static for the life of the system but may require a recalibration from time to time. These parameters can be used to compute an Extrinsic Matrix, H, per camera which includes the following transformations: Rotation, Translation, and Scale. Depending on the type of camera used, each camera may also have a Intrinsic Matrix, K, which defines the deformation from the real world 3D space to the 2D space on the cameras sensor that is not modeled by H. Then H and K together will be used to convert each camera's specific point cloud in its own coordinate system to the global coordinate system, giving us a final fused point cloud across all cameras $D_t$=[[R, G, B, X, Y, Z] ... ], which if the cameras are positioned correctly and the products are not stacked, give us a full 360 volumetric coverage of each product.

Once we have the global fused point cloud $D_t$, we can then run a clustering algorithm on $D_t$ to detect the existence of distinct objects. There are many clustering algorithms that can be used for this task. In one embodiment, we use a 3D CNN or RNN to cluster each specific point p=(x, y, z, R, G, B) to one of an unknown number of centroids. In other embodiments, we may be able to achieve the same thing with a simpler model like Density-based Scanning (DB-Scan) or Mean Shift.

In another embodiment, we would voxelize the space to create a voxel grid which is perhaps easier to perform a density per voxel estimation and apply a probabilistic analysis over the voxel space to get the distinct clusters.

In another embodiment, we apply an Oriented 3D volume detection from Pixel-wise neural network predictions where we take each cameras pixels and push them through a fully-convolutional neural network as the backbone and merge this data with a Header Network that is tasked with localizing the Objects size (height, length, width), shape (classification, embedding, or otherwise), and heading (angle/orientation in the global coordinate system in $\alpha$, $\beta$, and $\gamma$).

In all embodiments, this stage outputs a distinct number of objects we will denote as:

$\hat{V}_t = \{\hat{V}_t^1, \hat{V}_t^2, \ldots, \hat{V}_t^{n_t}\}$ where $n_t$ is the number of distinct Objects detected at time t, where each Object, $\hat{V}_t^i$ is a collection of RGBD points:

$$\hat{V}_t^i = [[\hat{x}_{t,i}^1, \hat{y}_{t,i}^1, \hat{z}_{t,i}^1, \hat{R}_{t,i}^1, \hat{G}_{t,i}^1, \hat{B}_{t,i}^1], [\hat{x}_{t,i}^2, \hat{y}_{t,i}^2, \hat{z}_{t,i}^2, \hat{R}_{t,i}^2, \hat{G}_{t,i}^2, \hat{B}_{t,i}^2] \ldots [\hat{x}_{t,i}^{m_{t,i}}, \hat{y}_{t,i}^{m_{t,i}}, \hat{z}_{t,i}^{m_{t,i}}, \hat{R}_{t,i}^{m_{t,i}}, \hat{G}_{t,i}^{m_{t,i}}, \hat{B}_{t,i}^{m_{t,i}}]]$$

where $m_{t,i}$ is the number of distinct points representing Object, $\hat{V}_t^i$ or some parameterized version thereof (i.e. an oriented bounding rectanguloid or ellipsoid).

3. Object Tracking to Match the New Volumes $V_t$ to the Old Volume Tracks $V_{t-1}$ In this stage, we take the distinct Objects detected in this time step, and attempt to "match" them to previously "Tracked Objects". Tracked Objects are Objects that have been detected by more than one timestep. Processing Tracked Objects help to smooth the detection and identification of Objects and provide more stability in frame to frame consistency. We perform this processing in the following way.

If the current timestep t=0, meaning that the system has just turned on, then the system will have no tracks in the system, and we will skip this step.

For all other timesteps, we will attempt to match the previous timesteps' Tracked Objects of this process that we will call $V_{t-1}$ (which is the same format as $\hat{V}_t$) and the output of the previous process $\hat{V}_t$ using a matching function $V_t = f(\hat{V}_t, V_{t-1})$.

There are many candidates for this matching. However for all candidates there are typically always two stages to each of the matching functions. The first is to compute a match score between each Tracked Object in the previous timestep, $V_{t-1}^1$, and each newly detected Object in the current timestep, $\hat{V}_t^i$, calculated as $c_{i,j} = \text{match}(V_{t-1}^i, \hat{V}_t^j)$. In one embodiment, we choose $\text{match}_O$ to be the 3D Intersection over Union where we will calculate the intersecting volume of each Object in $V_{t-1}$ and each volume in $\hat{V}_t$ as well as the combined volume of the merge of the two Objects, and divide the former by the latter. Since the time that elapses between t−1 and t is usually very small, less than a hundred milliseconds in some embodiments, the distance that a specific Object could travel in that time is typically very small so we would expect the intersection over the union of the Object to be near 1. We may also utilize further information for each Object using the RGB data of that volume such as a SSIM, Color Histogram, an embedding or KL Divergence or Perceptual Loss after a 3D CNN is applied to each Object.

4. Per Object, Perform the Following Analysis
  a. Measure Length, Width, and Height of the Object and x, y, z of the centroid in global coordinate system
    This is very straightforward to do once you have a merged track.
  b. 3D CNN to attempt to classify the Object as a specific UPC and deliver a probability distribution over the possible UPCs
    This is very straightforward to do once you have a merged track with template matching or a CNN trained on those UPCs.
  c. 3D CNN to identify the superclass of the Object as a type of product, the colors of the product, the material it is made of, the shape of it, etc.
    We would train a 3D CNN to output superclass information like this.
  d. OCR to read any text on the Object
    We would use an Optical Character Recognition (OCR) algorithm on each image captured at time t. There are many OCR algorithms to choose from.
    In one embodiment, we would use a CNN to infer a rotated bounding box [x1, y1, x2, y2, angle] for every word in the image. We would then input each bounding box crop in the image into a Convolutional Recurrent Neural Network (CRNN) to output the character sequence inside the box. In some embodiments, we may use a lexicon of possible words and use a Jaccard Similarity between each word in the lexicon and the outputted word to find the true word. If the detected words are near each other, we may merge them into a phrase.
    In all embodiments, we would take each detected set of words or phrases and assign it to the Object from which the bounding box has the highest Intersection Over Union with.
  e. Barcode Detection on all sides of the Object
    Same as OCR except we look for barcodes, not text.
  f. 3D CNN and 2D CNN to compute an embedding vector for the Object
    In some embodiments we would use a 3D CNN to compute an embedding vector per Object. This 3D CNN would be trained by taking a database of known Objects some of the same UPCs. At each stage of training we would select two training Objects of the same UPC and one training Object of a different UPC, and use a loss function like triplet embedding loss to give penalty to the 3D CNN if the model does not recognize the same Objects as the same and the different Object as different.
    In other embodiments we would use a 2D CNN to detect general purpose bounding boxes per camera. Then we would match each bounding box across all cameras to a specific Object. For each bounding box, we would compute an embedding vector that would encode and represent the set of pixels in the bounding box as a vector of n numbers. The 2D CNN would be trained in a similar process as the 3D CNN but instead the training Objects would be training bounding boxes.
    In some embodiments we will use both approaches!
5. Ensemble of all Features to Classify the Object Ft Features for this Object The key to detecting and identifying each Object with high certainty is to take a number of separate approaches and ensemble the results.

The output of this process will be a predicted SKU per Object with a corresponding confidence score.

6. Occlusion/Theft Identification

In the event there is an item that is purposely or accidentally occluded, the system will need to detect that event to ensure we do not miss a product. This would lead to lost sales and a loss for the retailer.

To detect an occlusion event, we can compare the sum of the total volume of all the Objects and the known volume of each of the identified Objects from a database. For example, if a specific jello has UPC=1234 and the product has a known height, width, and length, then the total expected volume of that product. If the volume of the Object is more than this, then there is likely an occluded product underneath it or on the side.

In another embodiment, we perform this function by leveraging a top camera and a bottom camera. If the detected SKU of the top and bottom cameras do not match, in that x,y of the checkout area, then the system will declare that there is a stack of products and alert the user to unstack the stack so that no product is on top of another product.

In all embodiments,
7. Not High Enough Confidence in Match
  Clear. The confidence needs to be above some threshold for us to declare it a matched SKU.
8. Personal Item Identified
  If a personal item or an item that is not for sale is identified as a Object, we need to classify it as such.
9. Confident Match Made to SKU Database
  Clear
10. Alert to Shopper/Cashier to Space Out Those Products Via a Video Screen Interface Clear 11. Wait Until Next Frame to Make a Classification for the Object Track. If Unclassified after 5 Seconds, Ask Shopper/Cashier to Manually Barcode Scan the Product Clear 12. Alert to Shopper/Cashier to Remove it from the Checkout Area Via a Video Screen Interface Clear 13. Variable Weight or not Clear 14. If Variable Weight, Look Up the Price Per lb and the Average Density of the Product Clear 15. Compute the Weight=Volume*Density If it is an identified fruit, we would calculate the density 16. Compute Price=Weight*Price Per LB Clear 17. If not, Look Up the Price of that SKU from the POS Clear 18. If Age Restricted, Alert Cashier to Confirm Age, or Use Age Recognition Via Another Camera System If one of the Objects matches to a SKU that is on a list of age restricted products, it is required by law for a human to check that person's identification to verify they are of legal age to purchase that item.

In one embodiment, the system will alert the store staff to check the shoppers identification before the shopper pays. The staff would check the person's identification and input that into the system to permit the shopper to pay, or if not of age, allow the shopper to remove that item from the basket.

In another embodiment, the system would leverage another way to verify the age of the shopper which could be a login/password, a cameras system that performs Face Detection then either Facial Recognition or Age Recognition to verify the shoppers age, or a fingerprint scanning to perform identification of the shopper which would access a database of fingerprints matched to customer's ages.

19. Display the Price Per SKU for all Objects with a SKU Matched and the Sum Thereof Displayed as the Total Bill which Will Permit the User to Pay that Amount, Bag their Items, and Leave the Store Clear The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for efficient checkout in a retail store, comprising:

providing a checkout stand with a conveyor for placement of items by a customer or cashier, providing at least one camera positioned to image items placed on the conveyor, and a computer processor and connected memory at the checkout station, connected to the camera to receive image data from the camera, when a customer's items have been placed on the conveyor, including non-labeled items including fruits or vegetables, moving the conveyor forward such that the customer's items move by and are imaged by the camera and images are sent to the processor and memory, with the processor and memory, applying a neural network to look for a match of a camera image of an item with a library image or images if available in the memory, and if a match is found, linking the camera image of the item with product identification data associated with the stored library image or images in the memory to thus identify the item, and adding the identified item to a list of customer items for purchase, displaying on a video screen the item imaged by the camera and identified, with a screen indication of successful identification, if an item on the conveyor is not matched to any known store item in the memory, indicating on the video screen that no match has been found and prompting the customer or cashier to scan the particular item with a barcode scanner or other unique product identification scanner adjacent to the conveyor and connected to the processor and memory, the customer's items including an item of produce sold by weight and without a unique identifying code, and the method including prompting the customer or cashier on the video screen to place the produce on a scale, and if no match is found with a library image of the produce item, prompting the customer or cashier to identify the item with an input to the processor, storing the camera image or images of the scanned, identified item in the memory, as part of a library of images of store items, each associated with product identity data, so that in future transactions the same item being purchased can be recognized by the processor by reference to the library, indicating on the video screen the successful identification of the item, and repeating the same routine for all customer items placed on the conveyor, as a primary means of product identification and adding all identified customer items to the list of customer items, and displaying charges for the customer.

2. A method for efficient checkout in a retail store, comprising:

providing a checkout stand with a conveyor for placement of items by a customer or cashier, providing at least one camera positioned to image items placed on the conveyor, and a computer processor and connected memory at the checkout station, connected to the camera to receive image data from the camera, when a customer's items have been placed on the conveyor, including non-labeled items including fruits or vegetables, moving the conveyor forward such that the customer's items move by and are imaged by the camera and images are sent to the processor and memory, with the processor and memory, applying a neural network to look for a match of a camera image of an item with a library image or images if available in the memory, and if a match is found, linking the camera image of the item with product identification data associated with the stored library image or images in the memory to thus identify the item, and adding the identified item to a list of customer items for purchase, displaying on a video screen the item imaged by the camera and identified, with a screen indication of successful identification, if an item on the conveyor is not matched to any known store item in the memory, indicating on the video screen that no match has been found and prompting the customer or cashier to scan the particular item with a barcode scanner or other unique product identification scanner adjacent to the conveyor and connected to the processor and memory, the customer's items including an item of produce sold by weight and without a unique identifying code, the checkout stand including a plurality of depth sensors adjacent to the conveyor to determine volume of the item of produce, and including the processor's calculating the weight of the item of produce by using a known density for the particular produce item multiplied by the volume of the produce item, storing the camera image or images of the scanned, identified item in the memory, as part of a library of images of store items, each associated with product identity data, so that in future transactions the same item being purchased can be recognized by the processor by reference to the library, indicating on the video screen the successful identification of the item, and repeating the same routine for all customer items placed on the conveyor, as a primary means of product identification and adding all identified customer items to the list of customer items, and displaying charges for the customer.

3. A method for efficient checkout in a retail store, comprising:

providing a checkout stand with a conveyor for placement of items by a customer or cashier, providing at least one camera positioned to image items placed on the conveyor, and a computer processor and connected memory at the checkout station, connected to the camera to receive image data from the camera, when a customer's items have been placed on the conveyor, moving the conveyor forward such that the customer's items move by and are imaged by the camera and images are sent to the processor and memory, with the processor and memory, applying a neural network to look for a match of a camera image of an item with a library image or images if available in the memory, and if a match is found, linking the camera image of the item with product identification data associated with the stored library image or images in the memory to thus identify the item, and adding the identified item to a list of customer items for purchase, and including use of the neural network to (a) infer whether there exists a product in each of a series of parts of the camera image, (b) impose a bounding box or shape to fit around each product determined to exist in the image, and (c) process each bounding box or shape as to degree of similarity to a stored product image, displaying on a video screen the item imaged by the camera and identified, with a screen indication of successful identification, if an item on the conveyor is not matched to any known store item in the memory, indicating on the video screen that no match has been found and prompting the customer or cashier to scan the particular item with a barcode scanner or other unique product identification scanner adjacent to the conveyor and connected to the processor and memory, storing the camera image or images of the scanned, identified item in the memory, as part of a library of images of store items, each associated with product identity data, so that in future transactions the same item being purchased can be recognized by the processor by reference to the library, indicating on the video screen the successful identification of the item, and repeating the same routine for all customer items placed on the conveyor, as a primary means of product identification and adding all identified customer items to the list of customer items, and displaying charges for the customer.

* * * * *